US007688380B2

(12) United States Patent
Sano et al.

(10) Patent No.: US 7,688,380 B2
(45) Date of Patent: Mar. 30, 2010

(54) IMAGING DEVICE

(75) Inventors: Toshiyuki Sano, Kanagawa (JP);
Kouichi Hoshino, Kanagawa (JP)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 11/718,770

(22) PCT Filed: Nov. 14, 2005

(86) PCT No.: PCT/JP2005/020790

§ 371 (c)(1),
(2), (4) Date: May 7, 2007

(87) PCT Pub. No.: WO2006/051936

PCT Pub. Date: May 18, 2006

(65) Prior Publication Data

US 2007/0296849 A1 Dec. 27, 2007

(30) Foreign Application Priority Data

Nov. 12, 2004 (JP) .............................. 2004-328812

(51) Int. Cl.
H04N 5/235 (2006.01)
H04N 5/232 (2006.01)
(52) U.S. Cl. .................................... 348/362; 348/222.1
(58) Field of Classification Search ................ 348/362
See application file for complete search history.

(56) References Cited

U.S. PATENT DOCUMENTS 6,747,694 B1 * 6/2004 Nishikawa et al. ....... 348/229.1

| 6,972,800 | B2 * | 12/2005 | Sano et al. ................... 348/362 |
| 7,050,094 | B2 * | 5/2006 | Krymski ................... 348/221.1 |
| 7,209,166 | B2 * | 4/2007 | Krymski ................... 348/221.1 |
| 7,508,421 | B2 * | 3/2009 | Tamaru et al. ........... 348/229.1 |
| 2001/0001245 | A1 * | 5/2001 | Kamishima et al. ......... 348/229 |
| 2001/0008419 | A1 | 7/2001 | Sano et al. |
| 2004/0051790 | A1 * | 3/2004 | Tamaru et al. ........... 348/223.1 |

FOREIGN PATENT DOCUMENTS

JP 2001-197362 7/2001
JP 2003-018457 1/2003

OTHER PUBLICATIONS

International Search Report (PCT/JP2005/020790) dated Apr. 18, 2006.

* cited by examiner

Primary Examiner—Lin Ye
Assistant Examiner—Amy Hsu
(74) Attorney, Agent, or Firm—Pearne & Gordon LLP

(57) ABSTRACT

It is an object of the present invention to provide an imaging device which can enhance an image in comparison with the conventional imaging device, even if the image shows high and low brightness objects in one frame, by improving each of image sections corresponding to the high and low brightness objects. The imaging device (10) comprises an imaging element (11) for outputting at least two image signals including long and short exposure signals different in light exposure from each other, knee process unit (12) for performing knee process on the long exposure signal, signal synthesizing unit (15) for performing the synthesis of the short exposure signal and the long exposure signal processed and received from the knee process unit (12), and knee level changing unit (18) for changing, on the basis of the signal level of the short exposure signal, a knee level defined at a knee point in each frame.

7 Claims, 10 Drawing Sheets

IMAGING DEVICE

TECHNICAL FIELD OF THE INVENTION

The present invention relates to an imaging device to be used in a video camera and the like.

DESCRIPTION OF THE RELATED ART

One of the conventional imaging devices is adapted to obtain two image signals by releasing its shutter at high and low speeds, and to produce a synthesized signal from the image signals (see, for example, a patent document 1). When an image of a low brightness object is taken by the imaging device, the imaging device produces a synthesized signal greatly affected by the image taken at low speed. When, on the other hand, an image of a high brightness object is taken by the imaging device, the imaging device produces a synthesized signal greatly affected by the image taken at high speed.

patent document 1: Jpn. unexamined patent publication No. 2003-18457 (page 5, FIG. 1)

DISCLOSURE OF THE INVENTION

Problems to be Solved by the Invention

The conventional imaging device, however, encounters such a problem that, when the image shows high and low brightness objects in one frame, the image is reduced in quality by reason that the reference level to be used for synthesis of images is a constant in one frame.

It is, therefore, an object of the present invention to provide an imaging device that can enhance an image in comparison with the conventional imaging device, even if the image shows high and low brightness objects in one frame, by improving each of image sections corresponding to the high and low brightness objects.

Means for Solving the Problems

The imaging device according to the present invention comprises: imaging means for producing at least two image signals as long and short exposure signals different in light exposure from each other; knee process means for processing on the long exposure signal; signal synthesizing means for performing the synthesis of the short exposure signal and the long exposure signal processed by the knee process means; and level changing means for changing, on the basis of the signal level of the short exposure signal, a knee level defined at a knee point.

The imaging device thus constructed as previously mentioned according to the present invention can enhance an image in comparison with the conventional imaging device, even if the image shows high and low brightness objects in one frame, by improving each of image sections corresponding to the high and low brightness objects by reason that the knee level is changed on the basis of the signal level of the short exposure signal.

In an imaging device according to the present invention, the signal level changing means is adapted to change, on the basis of the signal level of the short exposure signal, a synthesized level defined as a reference of the synthesis to be performed by the signal synthesizing means.

The imaging device thus constructed as previously mentioned according to the present invention can enhance, in comparison with the conventional imaging device, an image showing high and low brightness objects by reason that the signal level changing means is adapted to change, on the basis of the signal level of the short exposure signal, a synthesized level defined as a reference level for the synthesis to be performed by the signal synthesizing means, The imaging device according to the present invention, comprises: imaging means for outputting at least two image signals including long and short exposure signals different in light exposure from each other; signal synthesizing means for synthesizing the long and short exposure signals; and level changing means for changing, on the basis of the signal level of the short exposure signal, a synthesized level defined as a reference of the synthesis to be performed by the signal synthesizing means.

The imaging device thus constructed as previously mentioned according to the present invention can enhance an image in comparison with the conventional imaging device, even if the image shows high and low brightness objects in one frame, by improving each of image sections corresponding to the high and low brightness objects by reason that the reference level is changed in each frame on the basis of the signal level of the short exposure signal.

In the imaging device according to the present invention, the knee process means is adapted to perform the knee process at the knee point in each frame.

The imaging device thus constructed as previously mentioned according to the present invention can be reduced in production cost, in comparison with the conventional imaging device in which the knee process is performed in a plurality of knee points, by reason that the knee process means is simple in construction.

When the short exposure signal is being fluctuated in signal level with time, the level changing means is adapted to change continuously the knee level in response to changes of the signal level of the short exposure signal.

The imaging device thus constructed as previously mentioned according to the present invention can enhance an image, in comparison with the conventional imaging device in which the knee level is discontinuously changed, by reason that the knee level is smoothly changed in response to changes of the signal level of the short exposure signal.

When the short exposure signal is being fluctuated in signal level with time, the level changing means is adapted to change continuously the synthesized level in response to changes of the signal level of the short exposure signal.

The imaging device thus constructed as previously mentioned according to the present invention can enhance an image, in comparison with the conventional imaging device in which the synthesized level is discontinuously changed, by reason that the synthesized level is smoothly changed in response to changes of the signal level of the short exposure signal.

ADVANTAGEOUS EFFECT OF THE INVENTION

The present invention provides an imaging device that can enhance an image in comparison with the conventional imaging device, even if the image shows high and low brightness objects in one frame, by improving each of image sections corresponding to the high and low brightness objects.

EXPLANATION OF THE REFERENCE NUMERALS

10: imaging device
11: imaging element (imaging means)
15: knee process unit (knee process means)
17: signal synthesizing unit (signal synthesizing means)
18: level changing unit (level changing means)

DESCRIPTION OF THE PREFERRED EMBODIMENTS

The preferred embodiment of the imaging device according to the present invention will be described hereinafter with reference to accompanying drawings.

The following description will be directed to the construction of the imaging device according to the preferred embodiment of the present invention.

Figure 1:
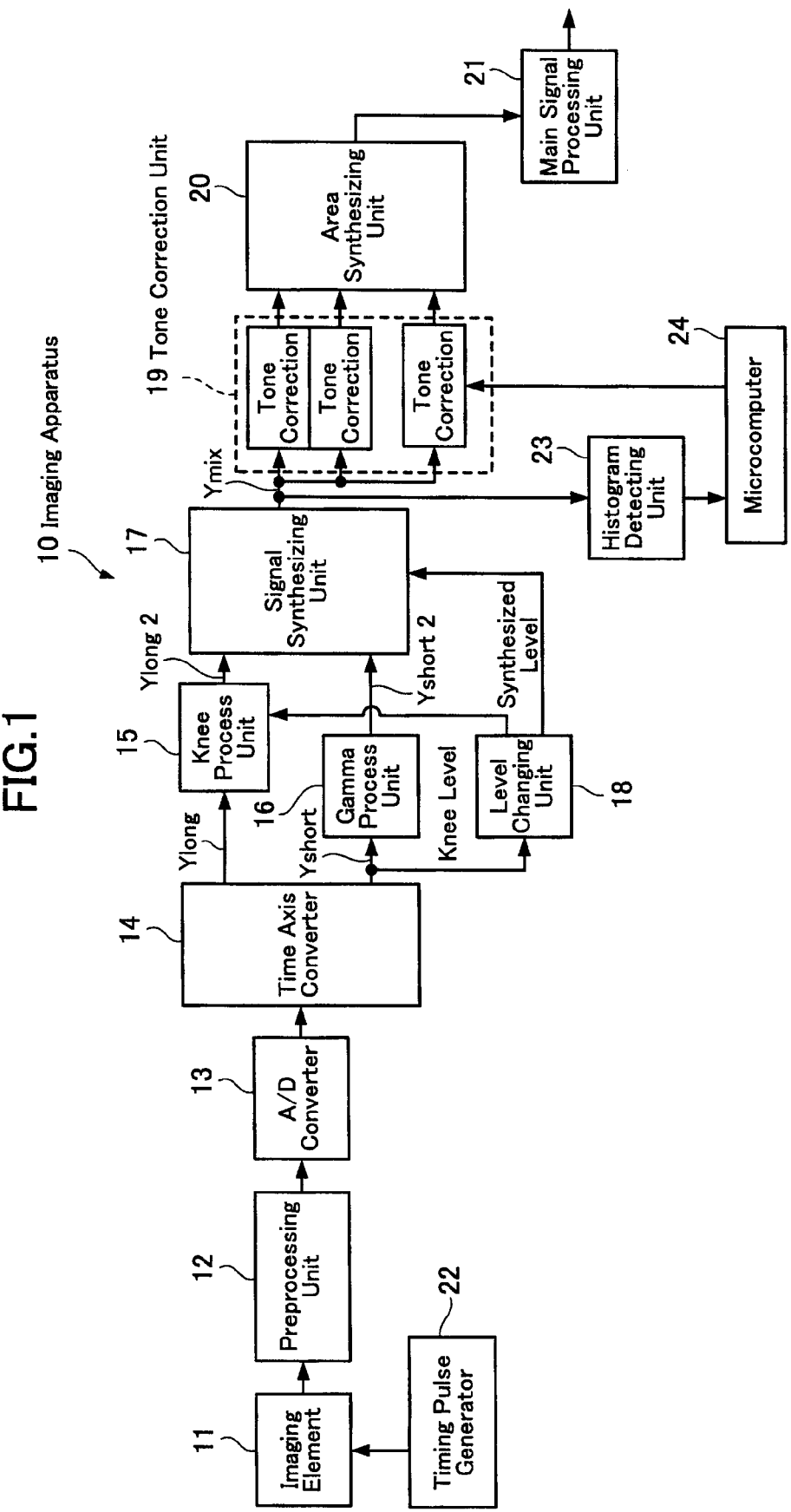
FIG. 1 is a block diagram showing an embodiment of the imaging device according to the present invention.

As shown in FIG. 1, the imaging device 10 comprises an imaging element 11 such as for example a charge coupled device (CCD) functioning as imaging means, the imaging element 11 being adapted to alternatively output at double speed in each frame two image signals different in light exposure from each other, i.e., long and short exposure signals, a preprocessing unit 12 for amplifying the image signal from the imaging device 11, an A/D converter 13 for converting the analog image signal amplified by the preprocessing unit 12 into a digital signal, a time axis converter 14 for outputting the short and long exposure signals $Y_{short}$ and $Y_{long}$ in parallel, a knee process unit 15 functioning as knee process means for performing a knee process on the short exposure signal $Y_{short}$ from the time axis converter 14, and a gamma process unit 16 functioning as gamma process means for performing a gamma process on the long exposure signal $Y_{long}$, a signal synthesizing unit 17 functioning as signal synthesizing means for performing a synthesis of the long exposure signal $Y_{long}$ processed by the knee process unit 15 and the short exposure signal $Y_{short}$ processed by the gamma process unit 16, a level changing unit 18 functioning as level changing means for changing, on the basis of the short exposure signal from the time axis converter 14, a signal level which is defined at a knee point (hereinafter referred to as "knee level"), and which is used in the knee process of the knee process unit 15, and a signal level which is defined as a reference of the synthesis to be performed by the signal synthesizing unit 17 (hereinafter referred to as "synthesized level"), a tone correction unit 19 for performing a tone correction on the short exposure signal $Y_{short}$ outputted by the signal synthesized unit 17, an area synthesizing unit 20 for performing an area synthesis of a luminance signal processed by the tone correction unit 19, a main signal processing unit 21 for performing conventional luminance signal and color signal processes on the signal outputted by the area synthesizing unit 20, a timing pulse generator 22 for generating a timing pulse signal to drive the imaging element 11 in response to the timing pulse signal, a histogram detecting unit 23 for dividing the synthesized signal $Y_{mix}$ into a plurality of sections, and detecting histogram information of each section, and a microcomputer 24 for computing a compensation characteristic of each section of the synthesized signal $Y_{mix}$ on the basis of the histogram information detected by the histogram detecting unit 23, and setting the compensation characteristic of each section to the tone correction unit 19.

Figure 2:
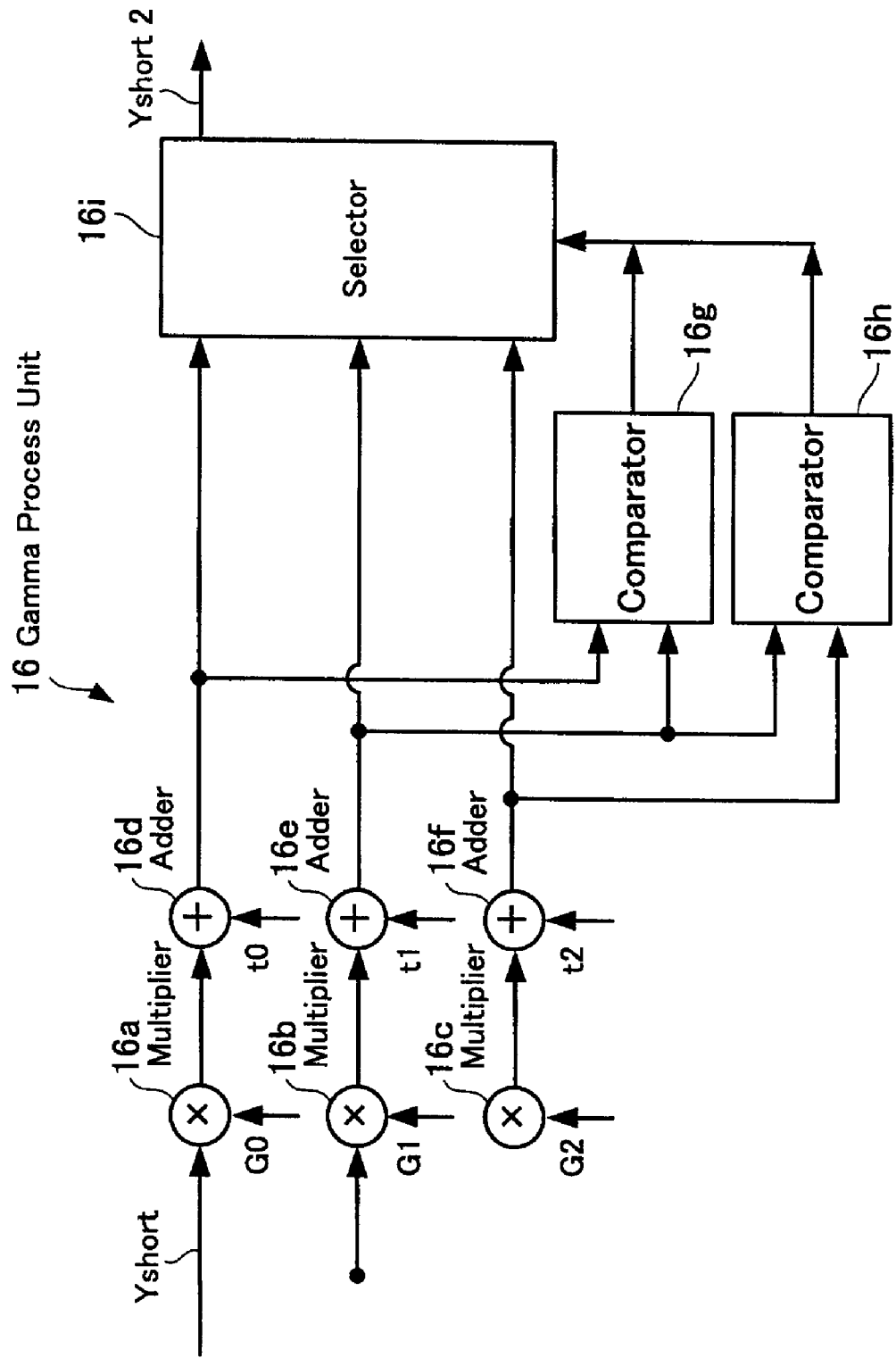
FIG. 2 is a block diagram showing the construction of the gamma correction unit of the imaging device according to the embodiment of the present invention.

As shown in FIG. 2, the gamma process unit 16 includes multipliers 16a, 16b, and 16c for multiplying the short exposure signal $Y_{short}$ with respective gains G0, G1, and G2 defined as exposure ratio gain, adders 16d, 16e, and 16f for adding offset values t0, t1, and t2 to the respective signals outputted by the multipliers 16a, 16b, and 16c, a comparator 16g for comparing the signal from the adder 16d with the signal from the adder 16e, a comparator 16h for comparing the signal from the adder 16e with the signal from the adder 16f, and a selector 16i for selecting, on the basis of the comparisons performed by the comparators 16e and 16f, one of the signals from the adders 16d, 16e, and 16f, the selected signal being smaller in signal level than the remaining signals, and outputting the selected signal as the short exposure signal $Y_{short2}$.

Figure 3:
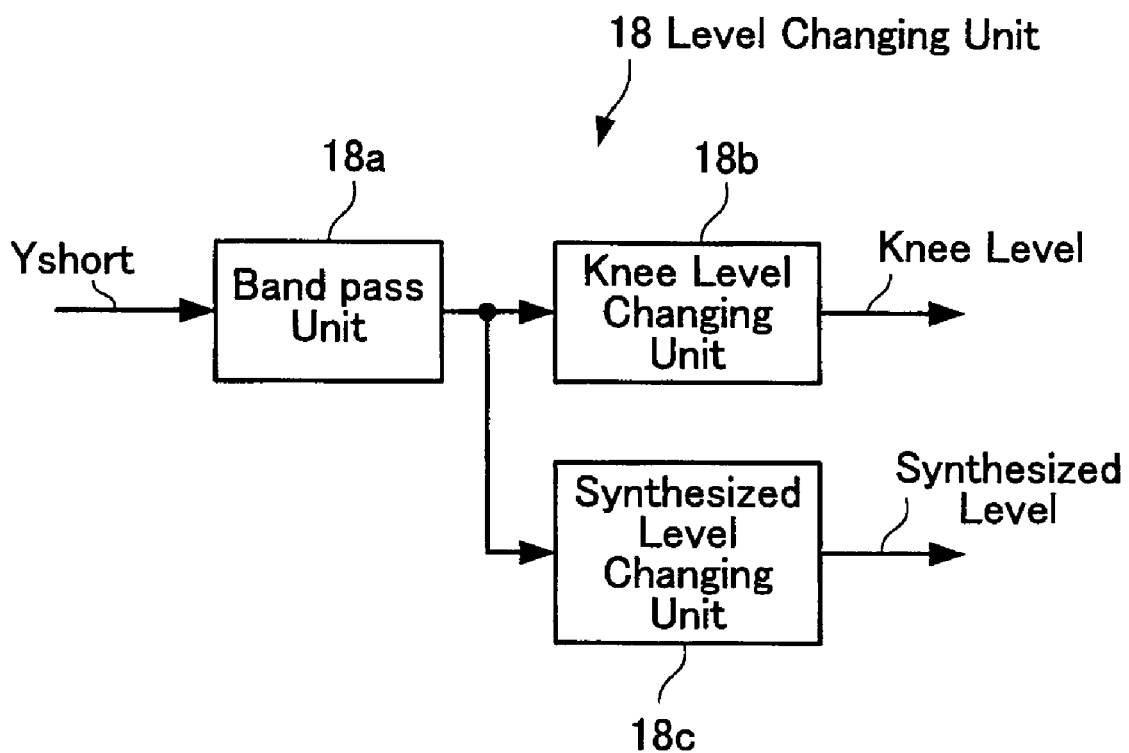
FIG. 3 is a block diagram showing the construction of the level changing unit of the imaging device according to the embodiment of the present invention.

As shown in FIG. 3, the level changing unit 18 includes a band limiting unit 18a for performing a band limitation of the short exposure signal $Y_{short}$ to moderate the fluctuation of the knee level in each frame, a knee level changing unit 18b for changing, on the basis of the signal level of the short exposure signal $Y_{short}$ limited in band by the band limiting unit 18a, the knee level to be used in the knee process of the knee process unit 16 (see FIG. 1), and a synthesized level changing unit 18c for changing, on the basis of the signal level of the short exposure signal $Y_{short}$ limited in band by the band limiting unit 18a, the synthesized level of the signal synthesizing unit 17 (see FIG. 1).

Figure 4:
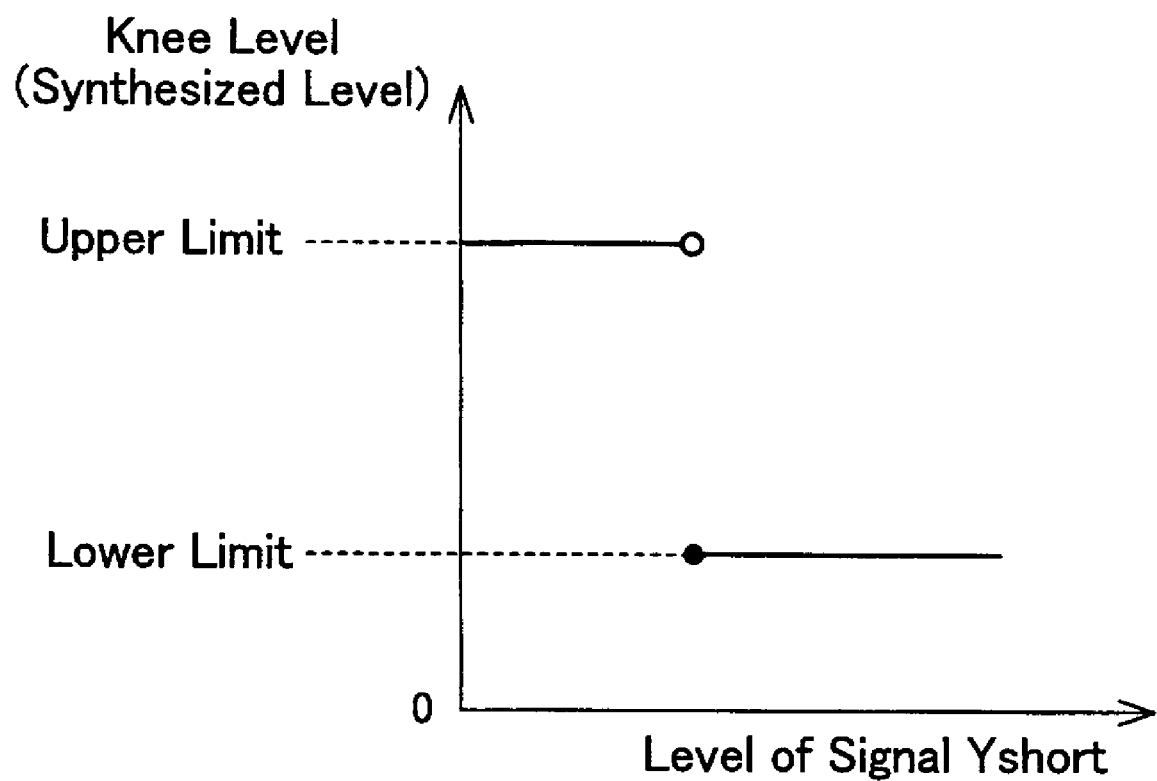
FIG. 4 is a diagram showing the relationship between the short exposure signal and the knee level (synthesized level) to be changed by the level changing unit of the imaging device according to the embodiment of the present invention.

Further, the level changing unit 18 is adapted to change the knee level and the synthesized level on the basis of the signal level of the short exposure signal $Y_{short}$ from the time axis converter 14 as shown in FIG. 4. In other words, the level changing unit 18 is adapted to increase the synthesized level to reduce the influence of the short exposure signal $Y_{short}$ on the synthesized signal $Y_{mix}$, and to increase the knee level to enhance the influence of the long exposure signal $Y_{long2}$ on the synthesized signal $Y_{mix}$ when the short exposure signal $Y_{short}$ is smaller than a predetermined threshold level in each frame. Here, the upper limit of each of the knee level and the synthesized level is previously decided on the basis of a range in which the quality of the image is not reduced. On the other hand, the level changing unit 18 is adapted to decrease the synthesized level to enhance the influence of the short exposure signal $Y_{short}$ on the synthesized signal $Y_{mix}$, and to decrease the knee level to allow the signal synthesizing unit to seamlessly synthesize the long exposure signal $Y_{long2}$ with the short exposure signal $Y_{short2}$ when the short exposure signal $Y_{short}$ is larger than a predetermined threshold level in each frame.

The following description will be then directed to the operation of the imaging device according to the preferred embodiment of the present invention.

The imaging element 11 produces, at double speed in synchronization with the timing pulse signal produced by the timing pulse generator 22, two imaging signals different in light exposure from each other, and outputs alternatively the image signals as long and short exposure signals $Y_{long}$ and $Y_{short}$ in each field.

The preprocessing unit 12 performs the operations such as for example the low frequency signal conversion of the correlation double sampling process, and the automatic gain control of the automatic gain control circuit, and the processed image signal to the A/D converter 13.

The time axis converter 14 separates one of the image signals from the A/D converter 13 from the other of the image signals from the A/D converter 13, and outputs the long and short exposure signals $Y_{long}$ and $Y_{short}$ in parallel at a standard speed.

Here, the level changing unit 18 changes, on the basis of the signal level of the short exposure signal $Y_{short}$ outputted by the time axis converter 14, the knee level of the knee process unit 15 and the synthesized level of the signal synthesizing unit 17. The level changing unit 18 sets upper and lower limits to ensure that the synthesized level of the signal synthesizing unit 17 is around 100% of the image signal to be outputted by the main signal processing unit 21, and to ensure that the knee level of the knee process unit 15 is slightly smaller than the synthesized level, in other words, the knee level of the knee process unit 15 is around 80% of the image signal to be outputted by the main signal processing unit 21.

Figure 5:
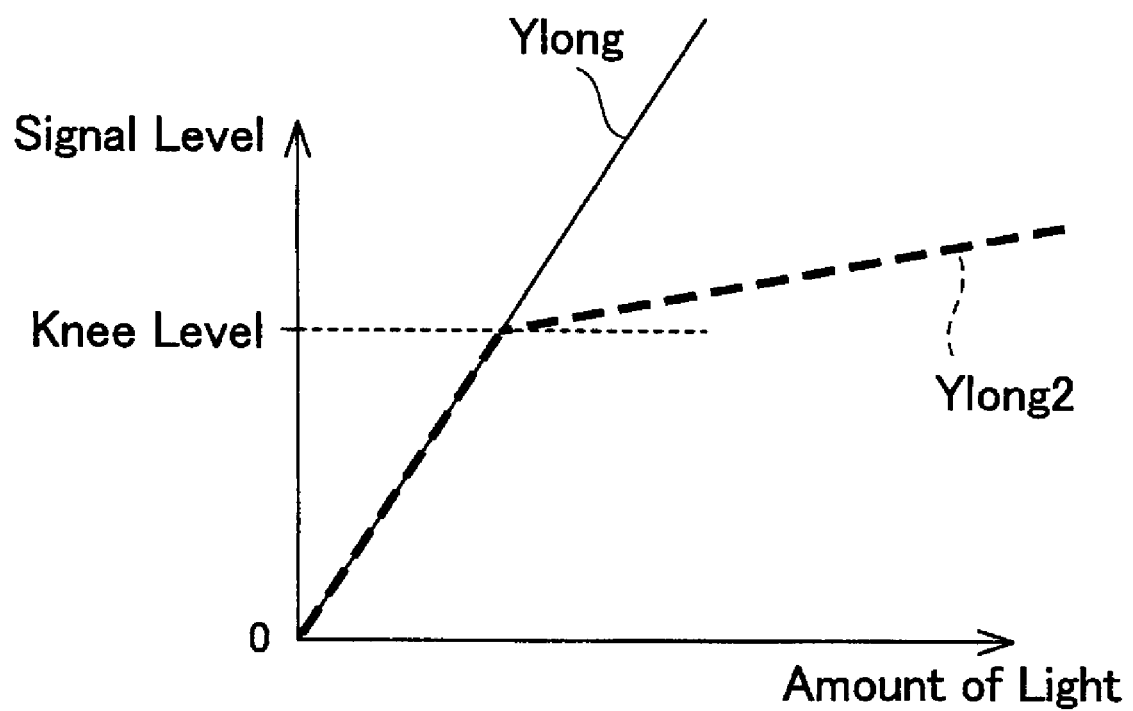
FIG. 5 is a diagram showing the relationship between the signal level and the light volume of the long exposure signal produced by the imaging device according to the present invention.

The knee process unit 15 performs the knee process on the long exposure signal $Y_{long}$ received from the time axis converter 14 on the basis of the knee level changed by the level changing unit 18, and outputs as a long exposure signal $Y_{long2}$ as shown in FIG. 5. More specifically, the knee process unit 15 outputs the long exposure signal $Y_{long2}$ by setting a gain of 1 under the condition that the signal level of the long exposure signal $Y_{long}$ is smaller than the knee level changed by the level changing unit 18, setting a gain of about ¼ to ½ under the condition that the signal level of the long exposure signal $Y_{long}$ is equal to or larger than the knee level changed by the level changing unit 18, and by multiplying the long exposure signal $Y_{long}$ with the gain.

Figure 6:
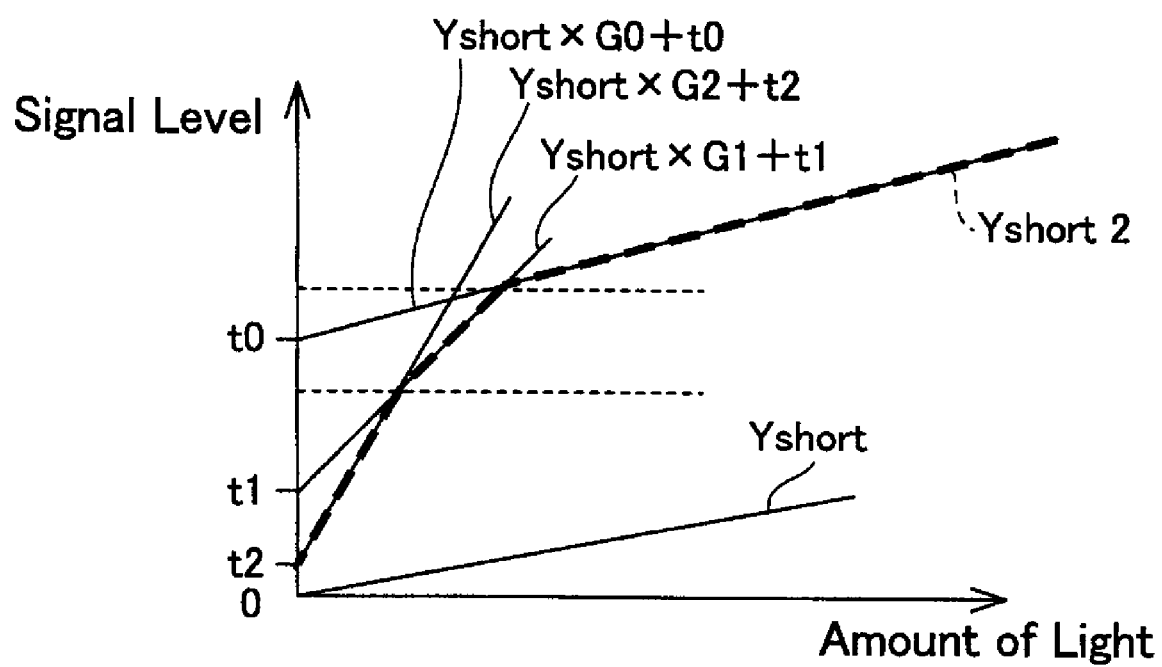
FIG. 6 is a diagram showing the relationship between the signal level and the light volume of the short exposure signal produced by the imaging device according to the present invention.

On the other hand, the gamma process unit 16 performs the gamma process on the short exposure signal $Y_{short}$ from the time axis converter 14, and outputs the short exposure signal $Y_{short2}$ shown in FIG. 6. More specifically, in the gamma process unit 16, the multiplier 16a multiplies the short exposure signal $Y_{short}$ with a gain G0, while the adder 16d adds the offset value t0 to the short exposure signal $Y_{short}$ from the multiplier 16a. The multiplier 16b multiplies the short exposure signal $Y_{short}$ with a gain G1, while the adder 16e adds the offset value t1 to the short exposure signal $Y_{short}$ from the multiplier 16b. the multiplier 16c multiplies the short exposure signal $Y_{short}$ with a gain G2, while the adder 16f adds the offset value t2 to the short exposure signal $Y_{short}$ from the multiplier 16c. The selector 16i selects, on the basis of the comparisons performed by the comparators 16g and 16h, one signal from among the signals received from the adders 16d to 16f, the selected signal being smaller in signal level from the remaining signals. The gamma process unit 16 outputs the signal selected by the selector 16i as the short exposure signal $Y_{short2}$.

Figure 7:
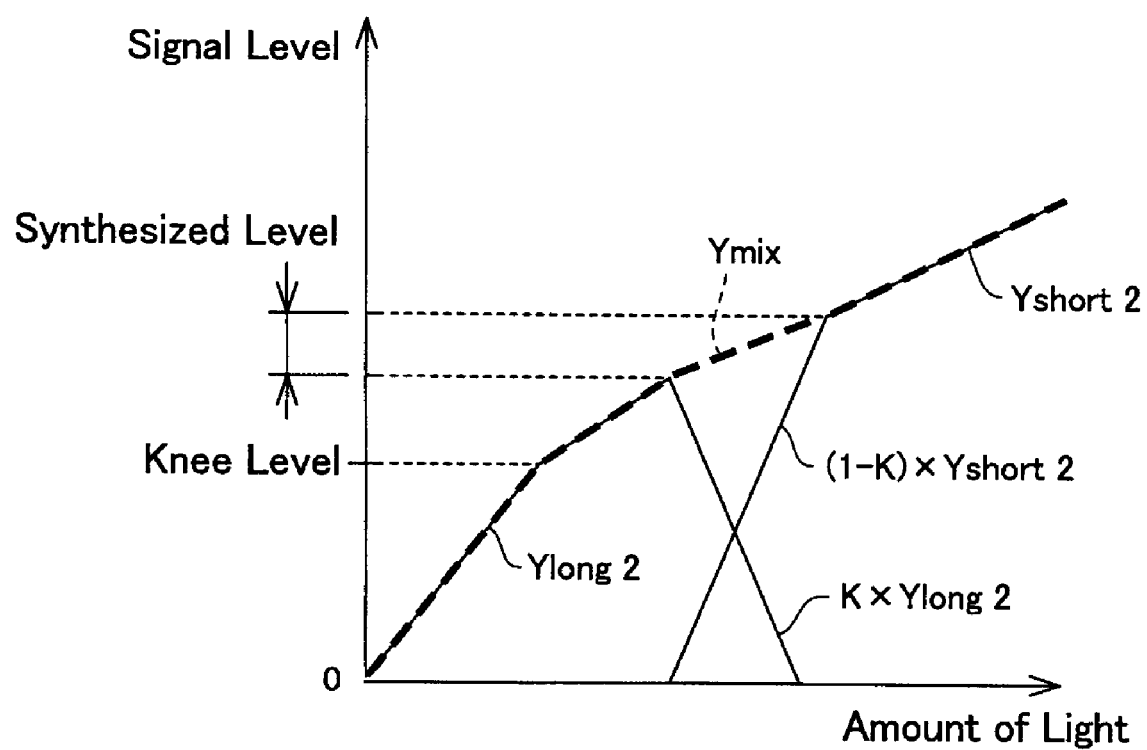
FIG. 7 is a diagram showing the relationship between the signal level and the light volume of the synthesized signal produced by the imaging device according to the embodiment of the present invention.

The signal synthesizing unit 17 synthesizes, on the basis of the synthesized level changed by the level changing unit 18, the signal $Y_{mix}$ shown in FIG. 7 from the long exposure signal $Y_{long2}$ from the knee process unit 15 and the short exposure signal $Y_{short2}$ from the gamma process unit 16. More specifically, the signal synthesizing unit 17 output the synthesized signal $Y_{mix}$ by using the long exposure signal $Y_{long2}$ when the signal level of the short exposure signal $Y_{short}$ is equal to or smaller than the synthesized level changed by the level changing unit 18, by using a signal computed by addition of the long exposure signal $Y_{long2}$ multiplied with compression gain K and the short exposure signal $Y_{short2}$ multiplied with compression gain (1−K), and by using the short exposure signal $Y_{short2}$ when the signal level of the short exposure signal $Y_{short}$ is larger than the synthesized level changed by the level changing unit 18.

The histogram detecting unit 23 divides the synthesized signal $Y_{mix}$ received from the signal synthesizing unit 17 into a plurality sections, and detects histogram information of each section of the synthesized signal $Y_{mix}$, while the microcomputer 24 calculates correction characteristics of each section of the synthesized signal $Y_{mix}$ on the basis of the histogram information detected by the histogram detecting unit 23, and sets the calculated correction characteristics to the tone correction unit 19. As a method of dividing the synthesized signal $Y_{mix}$ into a plurality of sections, the image represented by the image signal may be simply divided into rectangle sections. As another method, the image is divided into a section larger in brightness than a predetermined threshold level, and a section equal to or smaller in brightness than the threshold level.

In each section, the tone correction of the synthesized signal $Y_{mix}$ from the signal synthesizing unit 17 is then performed by the tone correction unit 19 on the basis of the correction characteristics set by the microcomputer 18. Here, the tone correction unit 19 enhances contrast of the image by performing the tone correction of the synthesized signal $Y_{mix}$ on the basis of the frequency of the histogram of each section.

Then, the area synthesizing unit 20 performs the synthesis of a signal of each section outputted by the signal $Y_{mix}$, to produce a seamlessly-synthesized signal. Here, the area synthesizing unit 20 synthesizes the signal of each section on the basis of division information used by the histogram detecting unit 23.

Finally, the main signal processing unit 21 performs the luminance signal process, the color signal process, and the like on the synthesized signal from the signal synthesizing unit 20, and outputs the processed signal as an image signal.

Figure 8:
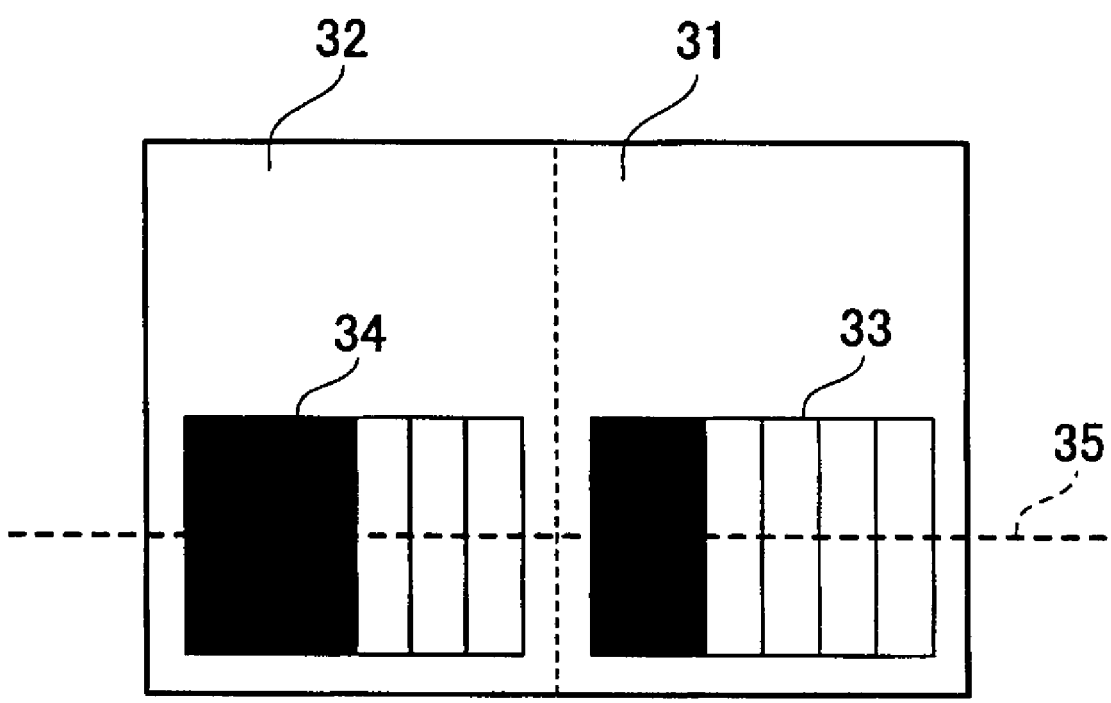
FIG. 8 is a front view showing an example of objects of an image to be taken by the imaging device according to the embodiment of the present invention.

When the imaging device 10 thus constructed takes an image indicative of an object including two grayscale charts 33 and 34 respectively located in high and low brightness sections 31 and 32 as shown in, for example, FIG. 8, the imaging element 11 outputs; long and short exposure signals $Y_{long}$ and $Y_{short}$ different in light exposure from each other. More specifically, the left half of the image represented by the long exposure signal $Y_{long}$ corresponds to the low brightness section 32, and is appropriate in light exposure. The right half of the image represented by the long exposure signal $Y_{long}$ corresponds to the high brightness section 31, and is saturated in light exposure. On the other hand, the left half of the image represented by the short exposure signal $Y_{short}$ corresponds to the low brightness section 32, and is too low in light exposure. The right half of the image represented by the short exposure signal $Y_{short}$ corresponds to the high brightness section 31, and is appropriate in light exposure. For example the long and short exposure signals $Y_{long}$ and $Y_{short}$ shown in FIGS. 9(a) and 9(b) represent images obtained along a line 35 in FIG. 8.

Then, the knee process unit 15 produces the long exposure signal $Y_{long2}$ from the long exposure signal $Y_{long}$ by performing the knee process on the long exposure signal $Y_{long}$ shown in FIG. 9(a). On the other hand, the gamma processing unit 16 produces the short exposure signal $Y_{short2}$ from the short exposure signal $Y_{short}$ by performing the gamma process on the short exposure signal $Y_{short}$ shown in FIG. 9(b).

Then, the signal synthesizing unit 17 synthesizes the signal $Y_{mix}$ shown in FIG. 9(e) from the long exposure signal $Y_{long2}$ shown in FIG. 9(c) and the short exposure signal $Y_{short2}$ shown in FIG. 9(d).

The tone correction unit 19 performs the tone correction on the synthesized signal $Y_{mix}$ shown in FIG. 9(e), and output a signal shown in FIG. 9(f).

Figure 9:
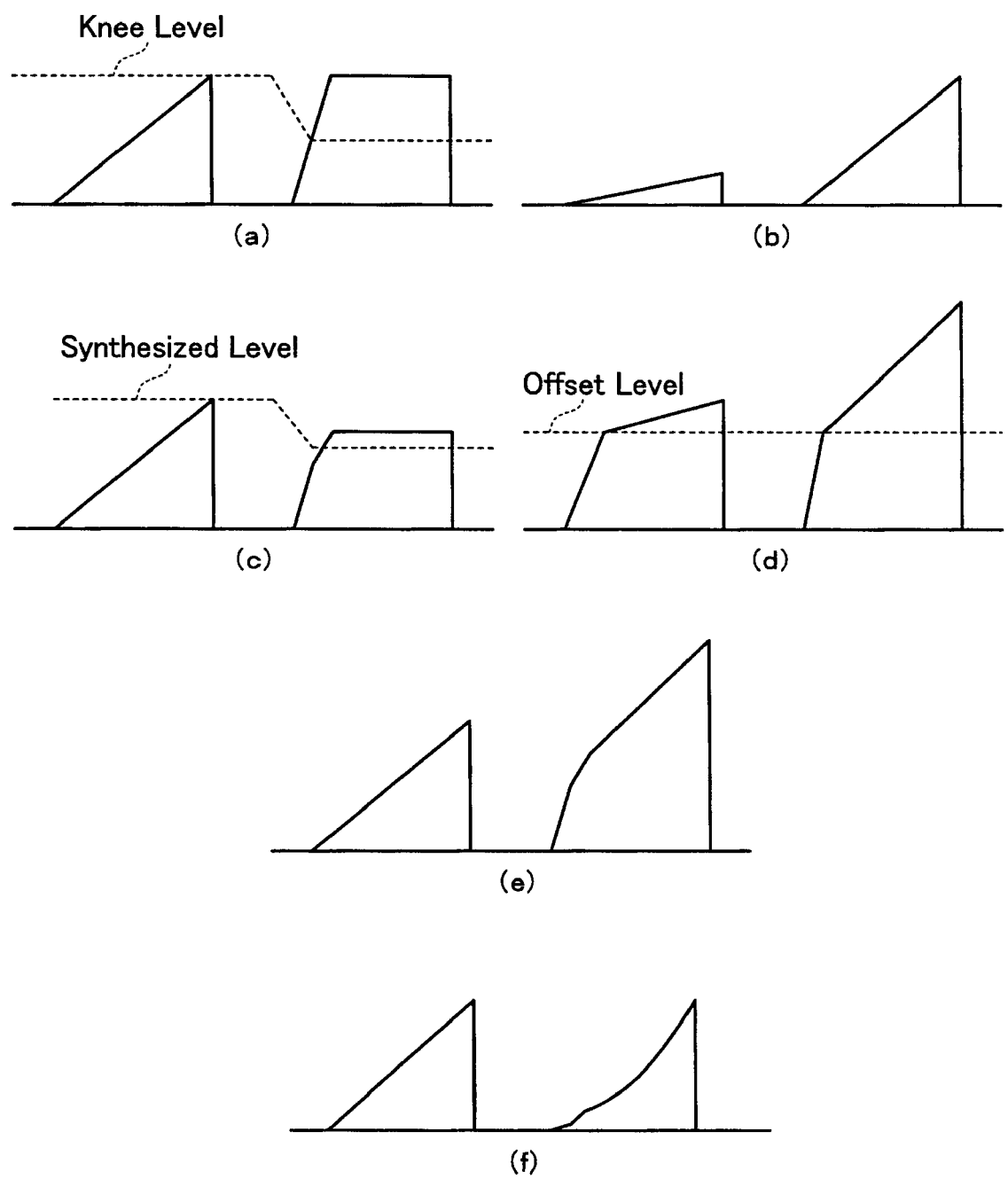
FIG. 9(b) is a diagram showing the short exposure signal to be outputted from the imaging element when the imaging device shown in FIG. 1 takes an image indicative of the object shown in FIG. 8.
FIG. 9(c) is a diagram showing the long exposure signal computed, by the knee process unit of the imaging device shown in FIG. 1, in the knee process from the long exposure signal shown in FIG. 9(a).
FIG. 9(d) is a diagram showing the short exposure signal computed, by the gamma process unit of the imaging device shown in FIG. 1, in the gamma process from the short exposure signal shown in FIG. 9(b).
FIG. 9(e) is a diagram showing the synthesized signal produced, by the signal synthesizing unit of the imaging device shown in FIG. 1, from the long exposure signal shown in FIG. 9(c) and the short exposure signal shown in FIG. 9(d).
FIG. 9(f) is a diagram showing the image signal produced when the tone correction and the like of the synthesized signal shown in FIG. 9(e) are performed by the tone correction unit of the imaging device shown in FIG. 1.
Figure 10:
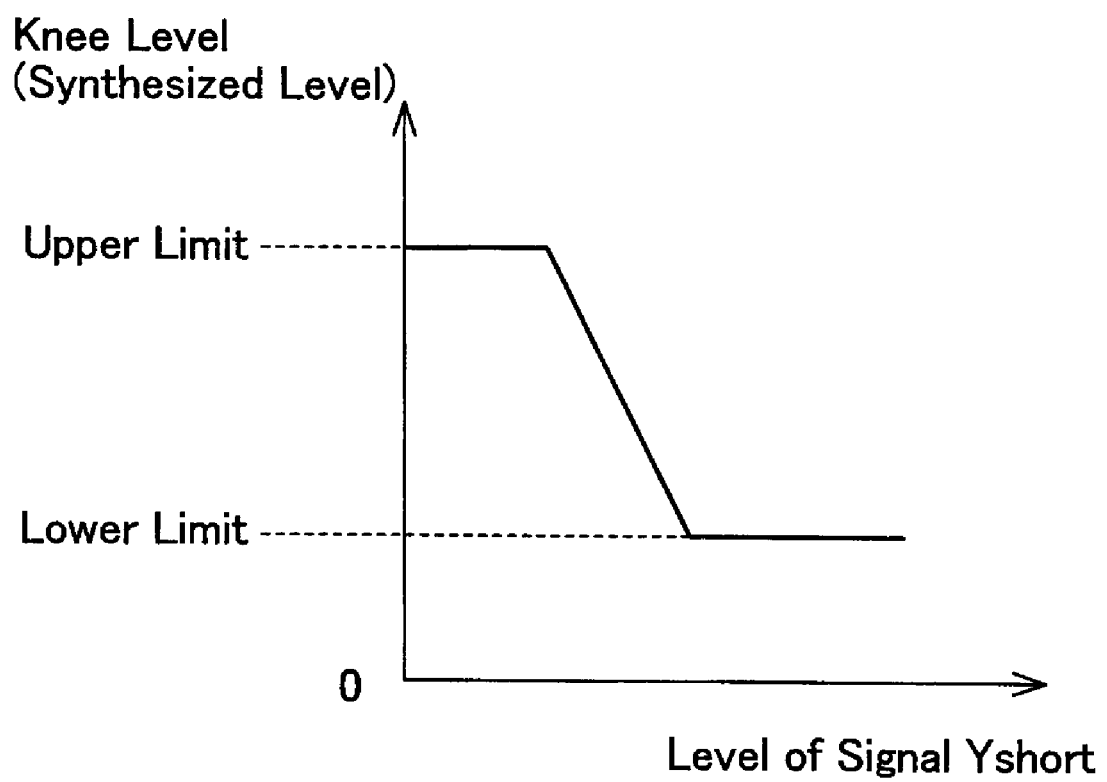
FIG. 10 is a diagram showing another example of the relationship between the short exposure signal and the knee level (synthesized level) to be changed by the knee level changing unit of the imaging device shown in FIG. 1, this example being different from that shown in FIG. 4.

As shown in FIG. 9, the imaging device 10 can enhance an image including high and low brightness sections 31 and 32 corresponding to grayscale charts 33 and 34 in one frame by changing the knee level and the synthesis level on the basis of the signal level of the short exposure signal $Y_{short}$ without affecting an image signal corresponding to the low brightness section 32.

From the foregoing description, it will be understood that the imaging device 10 according to the present invention can enhance an image in comparison with the conventional imaging device, even if the image shows high and low brightness objects in one frame, by improving each of image sections corresponding to the high and low brightness objects by reason that the knee level and the synthesized level are changed in one frame on the basis of the signal level of the short exposure signal $Y_{short}$.

Further, the imaging device 10 can produce the seamlessly-synthesized signal $Y_{mix}$ by performing, as nonlinear process, the knee process on the long exposure signal $Y_{long}$, and performing, as nonlinear process, the gamma process on the short exposure signal $Y_{short}$.

As shown in FIG. 5, the knee process unit 15 is adapted to perform the knee process on the image signal at one knee point. On the other hand, the conventional knee process unit is adapted to perform the knee process on the image signal at a plurality of knee points. Therefore, the knee process unit 15 is simple in construction in comparison with the conventional knee process unit. This means that the imaging device can be reduced in production cost in comparison with the conventional imaging device. Needless to say, the knee process may be performed at a plurality of knee points by the knee process unit 15 of the imaging device 10.

In this embodiment, as shown in FIG. 4, the level changing unit 18 of the imaging device 10 is adapted to change, on the basis of changes of the signal level of the short exposure signal $Y_{short}$, the knee level and the synthesized level in a discontinuous manner in this embodiment. However the level changing unit may be adapted to change, on the basis of changes of the signal level of the short exposure signal $Y_{short}$, the knee level and the synthesized level in a continuous manner. The imaging device 10 can enhance, in comparison with the case that the knee level and the synthesized level are discontinuously changed on the basis of changes of the signal level of the short exposure signal $Y_{short}$, an image by reason that the signal changing unit 18 is adapted to smoothly and continuously change the knee level and the synthesized level on the basis of changes of the signal level of the short exposure signal $Y_{short}$.

As a method of performing the tone correction of the synthesized signal $Y_{mix}$, the imaging device 10 may be adapted to perform the tone correction of the synthesized signal $Y_{mix}$ on the basis of a method other than the method mentioned in this embodiment.

INDUSTRIAL APPLICABILITY OF THE PRESENT INVENTION

As will be seen from the foregoing description, the present invention has an advantageous effect of enhance an image in comparison with the conventional imaging device, even if the image shows high and low brightness objects in one frame, by improving each of image sections corresponding to the high and low brightness objects, and useful as an imaging element to be used in a video camera or the like.

What is claimed is:

1. An imaging device, comprising:
    imaging means for producing at least two image signals including long and short exposure signals different in light exposure from each other;
    level changing means for changing, on the basis of the signal level of said short exposure signal in part of a relevant image, a knee level defined at a knee point;
    knee process means for performing knee processing of said long exposure signal on the basis of said signal level changed by said level changing means in part of said relevant image; and
    signal synthesizing means for producing a synthesized signal from said short exposure signal and said long exposure signal processed by said knee process means.

2. An imaging device as set forth in claim 1, in which said changing means is adapted to change, on the basis of the signal level of said short exposure signal in part of said relevant image, a synthesized level defined as a reference of said synthesis to be performed by said signal synthesizing means.

3. An imaging device, comprising:
    imaging means for outputting at least two image signals including long and short exposure signals different in light exposure from each other;
    signal synthesizing means for producing a synthesized signal from said long and short exposure signals; and
    level changing means for changing, on the basis of the signal level of said short exposure signal in part of a relevant image, a synthesized level defined as a reference of said synthesis to be performed by said signal synthesizing means.

4. An imaging device as set forth in claim 1, in which said knee process means is adapted to perform said knee process at said knee point in each frame.

5. An imaging device as set forth in claim 1, in which, when said short exposure signal is being fluctuated in signal level with time, said level changing means is adapted to change continuously said knee level in response to changes of said signal level of said short exposure signal.

6. An imaging device as set forth in claim 2 or claim 3, in which, when said short exposure signal is being fluctuated in signal level with time, said level changing means is adapted to change continuously said synthesized level in response to changes of said signal level of said short exposure signal.

7. An imaging device as set forth in claim 1, in which,
said level changing means includes a band limiting unit for performing a band limitation of said short exposure signal to moderate the fluctuation of said knee level, a knee level changing unit for changing, on the basis of the signal level of said short exposure signal limited in band by said band limiting unit, and a synthesized level changing unit for changing, on the basis of the signal level of said short exposure signal limited in band by said band limiting unit, said synthesized level.

* * * * *